(12) United States Patent  
Liu et al.

(10) Patent No.: US 7,942,043 B2
(45) Date of Patent: May 17, 2011

(54) ON-BOARD AFTERTREATMENT DEVICE TAIL PIPE HYDROCARBON SLIP CALCULATION

(75) Inventors: Yi Liu, Troy, MI (US); Kevin Dean Sisken, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 112 days.

(21) Appl. No.: 12/388,869

(22) Filed: Feb. 19, 2009

(65) Prior Publication Data

US 2010/0206060 A1 Aug. 19, 2010

(51) Int. Cl.
*G01M 15/04* (2006.01)

(52) U.S. Cl. .................... 73/114.75; 73/114.61

(58) Field of Classification Search .............. 73/23.31, 73/114.69, 114.71, 114.75
See application file for complete search history.

(56) References Cited

U.S. PATENT DOCUMENTS

| | | | |
|---|---|---|---|
| 5,921,076 A | 7/1999 | Krutzsch et al. | |
| 5,938,715 A * | 8/1999 | Zhang et al. | 701/109 |
| 6,145,302 A * | 11/2000 | Zhang et al. | 60/274 |
| 6,170,259 B1 | 1/2001 | Boegner et al. | |
| 6,293,096 B1 | 9/2001 | Khair et al. | |
| 6,408,616 B1 * | 6/2002 | Mazur et al. | 60/277 |
| 6,463,732 B2 * | 10/2002 | Baeuerle et al. | 60/274 |
| 6,871,489 B2 * | 3/2005 | Tumati et al. | 60/285 |
| 6,898,929 B2 | 5/2005 | Asmus et al. | |
| 6,947,831 B2 * | 9/2005 | van Nieuwstadt | 701/114 |
| 6,959,542 B2 | 11/2005 | Taylor, III et al. | |
| 6,973,776 B2 | 12/2005 | van Nieuwstadt et al. | |
| 6,983,589 B2 * | 1/2006 | Lewis et al. | 60/277 |
| 6,990,800 B2 * | 1/2006 | van Nieuwstadt et al. | 60/277 |
| 6,990,854 B2 * | 1/2006 | van Nieuwstadt et al. | 73/114.75 |
| 6,993,900 B2 | 2/2006 | Upadhyay et al. | |
| 7,047,729 B2 | 5/2006 | van Nieuwstadt et al. | |
| 7,117,667 B2 | 10/2006 | Mital et al. | |
| 7,121,085 B2 * | 10/2006 | van Nieuwstadt | 60/286 |
| 7,216,478 B2 * | 5/2007 | Brown et al. | 60/277 |
| 7,371,353 B2 | 5/2008 | Robel et al. | |
| 7,526,950 B2 * | 5/2009 | Van Nieuwstadt et al. | 73/114.75 |
| 7,624,571 B2 * | 12/2009 | Tochikawa et al. | 60/297 |
| 7,685,814 B2 * | 3/2010 | Zhang et al. | 60/295 |
| 2005/0198942 A1 | 9/2005 | van Nieuwstadt et al. | |
| 2005/0279156 A1 * | 12/2005 | He et al. | 73/23.31 |
| 2006/0201139 A1 | 9/2006 | Khadiya | |
| 2007/0051099 A1 * | 3/2007 | Tochikawa et al. | 60/297 |
| 2007/0220865 A1 | 9/2007 | Cunningham et al. | |
| 2008/0028751 A1 | 2/2008 | Stroia et al. | |
| 2009/0217645 A1 * | 9/2009 | Sisken et al. | 60/286 |
| 2009/0223207 A1 * | 9/2009 | Ren | 60/286 |
| 2009/0277158 A1 * | 11/2009 | Baird et al. | 60/285 |
| 2010/0050757 A1 * | 3/2010 | Liu et al. | 73/114.75 |

* cited by examiner

*Primary Examiner* — Freddie Kirkland, III
(74) *Attorney, Agent, or Firm* — Bill C. Panagos; Rader, Fishman & Grauer PLLC

(57) ABSTRACT

A method to determine hydrocarbon slip in a compression ignition engine equipped with an electronic control unit having memory and coupled to an exhaust gas aftertreatment system having a diesel oxidation catalyst, a diesel particulate filter, a selective catalyst reducer and a clean up diesel oxidation catalyst.

12 Claims, 2 Drawing Sheets

ON-BOARD AFTERTREATMENT DEVICE TAIL PIPE HYDROCARBON SLIP CALCULATION

TECHNICAL FIELD OF THE INVENTION

Aftertreatment systems on diesel engines often contain a Diesel Oxidation Catalyst (DOC) which in many applications is utilized to oxidize a supplied hydrocarbon (via in cylinder or external dosing measures) to increase the temperature of the Diesel Particulate Filter (DPF) to regenerate or remove the soot that has been trapped within the DPF. This DOC does not necessarily burn 100% of the hydrocarbons (HC), and some of it slips the catalyst component substrates downstream of the DOC.

There is a need to develop an on board aftertreatment diagnostic to determine tail pipe hydrocarbon slip. In one embodiment, there is disclosed a method to calculate determine the hydrocarbon slip after each of these components (DPF and DOC), and also convert this determination to parts per million (ppm) all in a manner that is simple enough to be done on board the vehicle, generally within an electronic control unit (ECU), control logic is utilized to determine the ppm slip out of the DPF+DOC system to track the ability to comply with On Board Diagnostic (OBD) requirements for vehicles. This diagnostic can be utilized to track the efficiency of an included Ammonia Oxidation (AMOX) clean up catalyst should one be employed with a Selective Catalyst Reduction (SCR) system yielding tailpipe out HC slip in ppm.

BRIEF SUMMARY OF THE INVENTION

In one embodiment there is disclosed a method to determine hydrocarbon slip in an internal combustion engine, and more particularly, in a compression ignition engine, equipped with an electronic control unit having memory and coupled to an exhaust gas aftertreatment system having a diesel oxidation catalyst, a diesel particulate filter, a selective catalyst reducer and a clean up diesel oxidation catalyst. The method comprises determining a change in temperature of exhaust gas flow through the diesel oxidation catalyst component; determining a change in temperature of exhaust gas flow through the diesel particulate filter; determining a change in temperature through the selective catalyst reducer at the clean-up diesel oxidation catalyst outlet; and determining the efficiency of each exhaust gas aftertreatment component.

In another embodiment, there is disclosed a method to determine hydrocarbon slip in an compression ignition engine equipped with an electronic control unit having memory and coupled to an exhaust gas aftertreatment system having a diesel oxidation catalyst, a diesel particulate filter, a selective catalyst reducer and a clean up diesel oxidation catalyst comprising determining a change in temperature of exhaust gas flow through the diesel oxidation catalyst component; determining a change in temperature of exhaust gas flow through the diesel particulate filter; determining a change in temperature through the selective catalyst reducer at the clean-up diesel oxidation catalyst outlet; and determining the efficiency of each exhaust gas aftertreatment component.

In another embodiment, the change in exhaust gas flow temperature through the diesel catalyst component is determined according to:

$\Delta T_{doc}$=Sensed DOC out Temperature−Virtual DOC Out Temperature.

In another embodiment, the change in temperature of the DPF is determined according to:

$\Delta T_{DPF}$=Sensed DPF Out Temperature−Virtual DPF Out Temperature.

In another embodiment, the change in temperature of the exhaust gas flow at the clean-up DOC outlet is determined according to:

$\Delta T_{SCR+Clean-upDOC}$=Sensed Clean-Up DOC Out Temperature−Virtual Clean-Up Out DOC Temperature.

In another embodiment, the energy released at each catalyst due to hydrocarbon burning is determined according to:

$$\dot{Q} = C_p \cdot \dot{m}_{exh} \cdot \Delta T = \eta \cdot \dot{m}_{fuel} \cdot \Delta H \qquad (1)$$

Where $\eta$—catalyst efficiency
$\dot{m}_{fuel}$—HC Flow rate into the catalyst, kg/s
$\Delta H$—heat content of fuel, 43 MJ/kg for diesel fuel
$\Delta T$—Temperature increase due to HC burning (explained above)
$C_p$—exhaust specific heat, kJ/kg·K
$\dot{m}_{exh}$—Exhaust gas flow rate through the catalyst, kg/s
wherein the HC flow in mass faction, (1) becomes $$HC_{massfraction} = \frac{\dot{m}_{fuel}}{\dot{m}_{exh}} = \frac{C_p \cdot \Delta T}{\eta \cdot \Delta H} \qquad (2)$$

Converting the mass fraction to volume fraction (ppm) as $C_{14}H_{30}$ (as in normal diesel fuel), (2) changes to $$HC_{ppm(C14)} = \frac{\dot{m}_{fuel}/198}{\dot{m}_{exh}/29} = \frac{29 \cdot C_p \cdot \Delta T}{198 \cdot \eta \cdot \Delta H} \cdot 10^6 \qquad (3)$$

Since the HC concentration (ppm) is normally corrected to $C_1$, the ppm in $C_1$ will be $$HC_{ppm} = HC_{ppm(C1)} = 14 \cdot \frac{29 \cdot C_p \cdot \Delta T}{198 \cdot \eta \cdot \Delta H} \cdot 10^6 = \text{constant} \cdot \frac{\Delta T}{\eta} = k \cdot \frac{\Delta T}{\eta} \qquad (4)$$

Apply Equ. (4) to DOC, DPF and SCR+clean up DOC respectively, we have:

$$HC_{ppm,doc} = k \cdot \frac{\Delta T_{doc}}{\eta_{doc}} \qquad (5)$$

$$HC_{ppm,dpf} = k \cdot \frac{\Delta T_{dpf}}{\eta_{dpf}} \qquad (6)$$

$$HC_{ppm,scr+cleanupdoc} = k \cdot \frac{\Delta T_{scr+cleanupdoc}}{\eta_{scr+cleanupdoc}} \qquad (7)$$

DETAILED DESCRIPTION OF THE INVENTION

Figure 1:
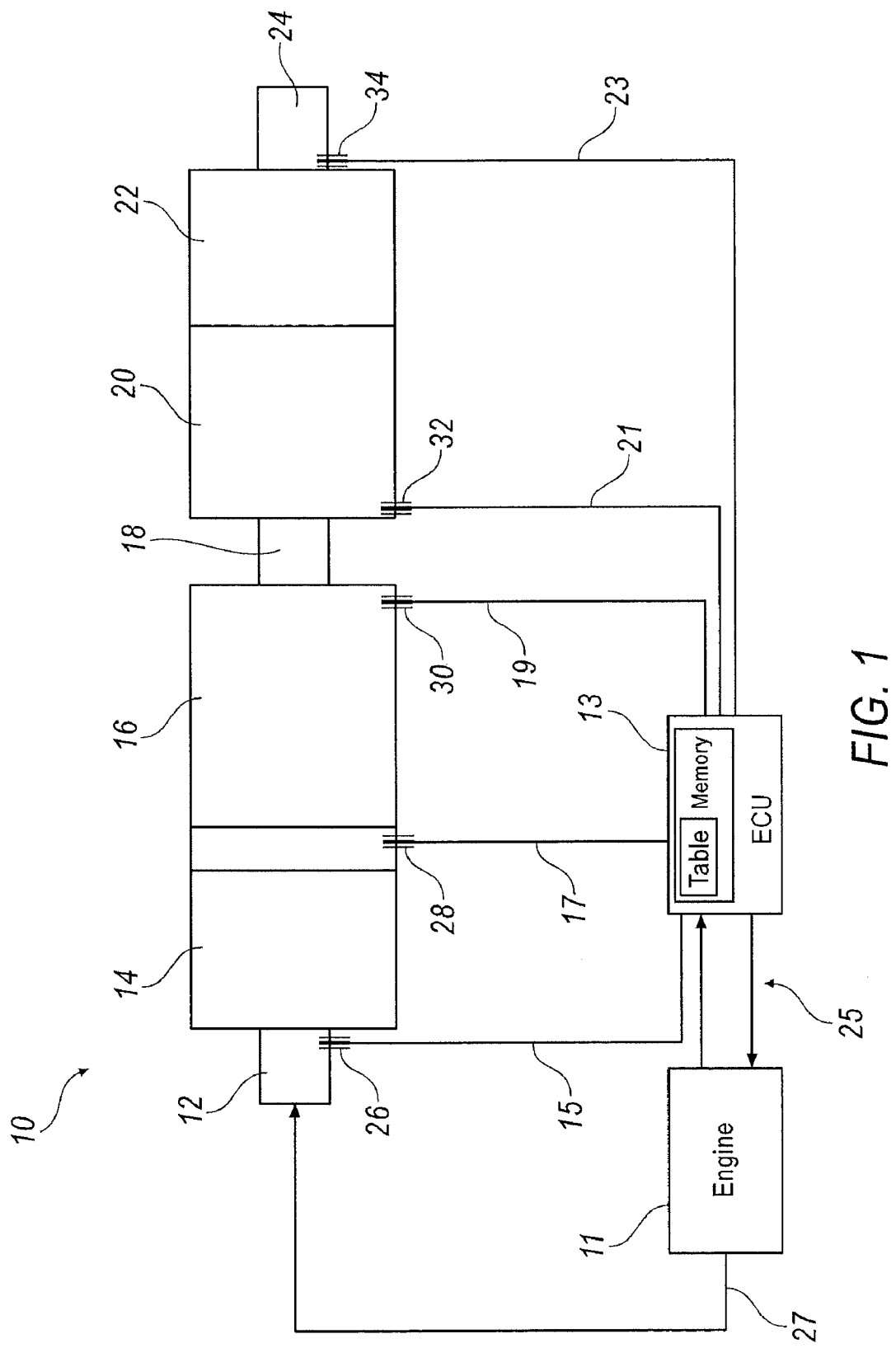
FIG. 1 is a schematic representation of an aftertreatment device or system for use with an internal combustion engine.

Turning now to the drawings wherein like numbers refer to like structures, and particularly to FIG. 1, there is disclosed a schematic representation of an aftertreatment device or system 10 for use with an internal combustion engine, including a compression ignition engine. The System 10 is connected at one end to an internal combustion engine exhaust manifold, schematically represented at 27, to vent exhaust from the engine through the system 10. The system 10 is comprised of a DOC inlet conduit 12, in fluid communication with exhaust manifold 27 at a first end and a DOC 14 at an opposite end. The DOC 14 is in close proximity to a DPF 16. DPF outlet conduit 18 is in fluid communication with SCR 20. SCR 20 is in a proximal position with a clean up DOC 22, from which exhaust outlet 24 permits the treated exhaust gas stream to vent to the atmosphere.

Temperature sensors are positioned along the system 10 to sense the temperature of the exhaust gas stream as it travels through the system. DOC inlet temperature sensor 26 and DPF inlet sensor 28 sense the temperature of the exhaust gas as it passes through the DOC 14. As one of ordinary skill will understand, the exhaust gas stream through the DOC is very hot. As the exhaust gas stream enters and leaves the DOC 14, DPF inlet temperature sensor acts as a DOC outlet temperature sensor. DPF outlet temperature sensor 30 is in close proximity to the conduit 18. DPF outlet temperature sensor 30 and SCR inlet temperature sensor 32 sense the temperature of the exhaust gas as it passes through the DPF and enters the SCR 20. The SCR outlet temperature sensor 34 senses the temperature of the exhaust gas stream as it exits the clean up DOC 22. Each of the sensors is electronically connected to an electronic control unit (ECU) 13 through electronic connections 15, 17, 19, 21, and 23, respectively. The ECU is usually on the engine and controls the operation of the engine. Specifically, the ECU contains the operating instruction and other software and algorithms necessary to the operation of the system and the engine. The ECU may be a single processor or a two processor controller, depending upon design considerations. If the ECU is a two processor controller, it may be comprised of a Motor Control Module (MCM) and a component control module (CPC), that communicate with each other. The MCM has the operating instructions for the engine, and the CPC has operating instructions for the components of the vehicle. The MCM has a memory with memory with tables or profiles that map or otherwise store values for the amount of hydrocarbons permitted in the exhaust stream at any point along the system 10. The memory may be PROM, EPROM, EEPROM, FLASH or any other memory. The MCM and the CPC communicate with the Engine and the other components. Without limitation, one suitable operating software program is DDEC available from Detroit Diesel Corporation.

Figure 2:
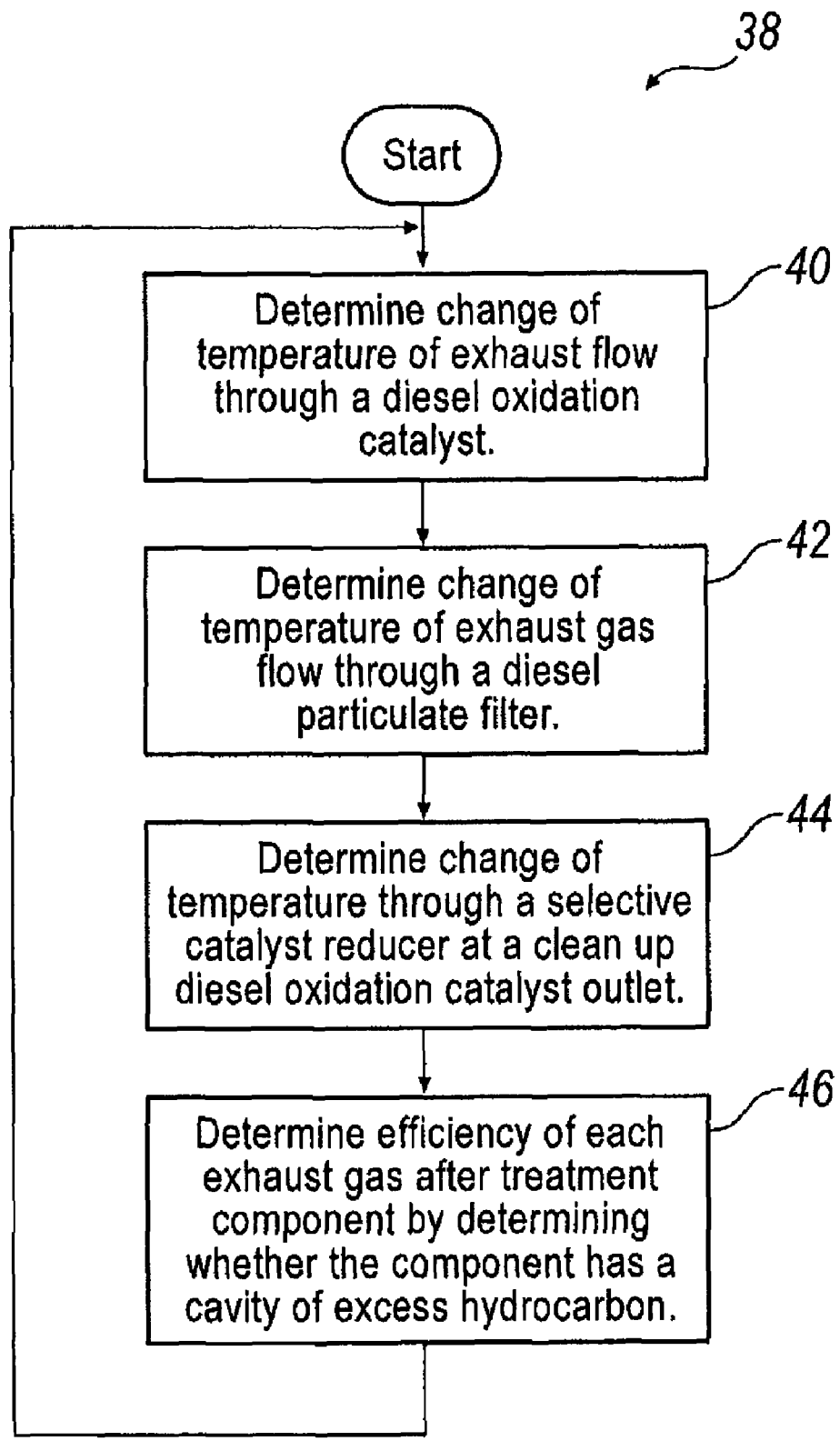
FIG. 2 is a schematic representation of a software flow diagram representing one method according to the present disclosure.

FIG. 2 is a schematic representation of a software flow diagram of one method 38 of determining hydrocarbon slip in an exhaust system. By determining the change in temperature of the exhaust gas between the various components in the system 10 (FIG. 1), the hydrocarbon slip can be determined. Specifically, Step 40 is determining the change of tempearature of the exhaust gas stream through a DOC. This may be accomplished by determining the temperature difference between the DOC inlet and the DOC outlet, to determine the $\Delta T_{doc}$. This permits the determination of the $HC_{slip.doc}$. Step 42 is determining the change of temperature of the exhaust gas stream through the diesel particulate filter. This may be accomplished by measuring the temperature difference from the DOC out and the DPF outlet. The temperature difference between the DOC out and the DPF out determines the $\Delta T_{dpf}$. The $HC_{slip\ dpf}$ is then determined and converted to ppm. Step 44 is determining the change in temperature of the exhaust gas stream through the Selective Catalyst Reducer (SCR) and a clean up DOC outlet. The temperature difference between the SCR inlet temperature and the clean up DOC outlet temperature is used to determine the $\Delta T_{scr+clean\ up\ doc}$. The exhaust gas stream then passes through the clean up DOC and the $HC_{slip\ tail\ pipe}$ is the $HC_{slip\ scr+clean\ up\ doc}$.

An exhaust pipe fuel injection system upstream of the DOC or an in cylinder late post injection event provides the HC species, and the DOC is designed to burn most of this fuel to increase the exhaust temperature to a level wherein the loaded soot on the DPF can be burned clean, via regeneration of the DPF or otherwise. Since the HC species may not always be oxidized 100% at each catalyst, especially as the catalysts age, an on board HC slip prediction method is necessary to permit modifications in the operation of the engine to ensure exhaust gas stream composition meets governmental regulations, or to warn the operator that the exhaust system components are in need of service.

The $\Delta T$ described earlier in this application is defined as the temperature increase across a given catalyst device due solely to the HC oxidation. The temperature rise ($\Delta T$) is equal to the measured (sensed) catalyst out temperature minus the virtual catalyst out temperature. The virtual catalyst out temperature is determined from the measured catalyst in temperature with correction of heat exchange between the exhaust gas stream and the catalyst substrate, as well as the temperature sensor delay. Since the insulation matt material between the catalyst substrate and the metal skin of the catalyst canning plus any other insulation methods prevent significant heat transfer from the substrate to the ambient, minimal heat loss is assumed. However, it is further contemplated that this heat loss could be determined and compensated for. The heat generated from the controlled soot burning in the DPF can be neglected because of its small scale, however, it is further contemplated that this potential source of error could be compensated for. It is further contemplated that any check for the ppm of the HC in the exhaust gas stream could be done only at the end of an active regeneration where soot burning is zero, but it is also contemplated to spot check the ppm of the HC over the entire system 10.

By way of example, starting with the DOC $\Delta T$ doc=sensed DOC out Temperature−virtual DOC out temperature.

The virtual DOC out temperature calculation needs the exhaust flow rate as input, and it can be obtained based upon engine configuration, operating condition, intake air input, and some correction tables in memory of the ECU. All other inputs are either constraints or experimental calibrated data, therefore the virtual DOC out temperature can be determined on board, as well as the $\Delta T$ doc. The same logic can be applied to the DPF and the clean up DOC catalyst to obtain $\Delta T$ dpf and $\Delta T$ scr+ clean up doc.

Assuming the energy released at each catalyst is due to hydrocarbon burning, it may be understood that:

$$\dot{Q}=C_p\cdot\dot{m}_{exh}\cdot\Delta T=\eta\cdot\dot{m}_{fuel}\cdot\Delta H \qquad (1)$$

Where η—catalyst efficiency $\dot{m}_{fuel}$—HC Flow rate into the catalyst, kg/s ΔH—heat content of fuel, 43 MJ/kg for diesel fuel ΔT—Temperature increase due to HC burning (explained above)

$C_p$—exhaust specific heat, kJ/kg·K $\dot{m}_{exh}$—Exhaust gas flow rate through the catalyst, kg/s Expressing the HC flow in mass faction, (1) becomes $$HC_{massfraction} = \frac{\dot{m}_{fuel}}{\dot{m}_{exh}} = \frac{C_p \cdot \Delta T}{\eta \cdot \Delta H} \quad (2)$$

Converting the mass fraction to volume fraction (ppm) as $C_{14}H_{30}$ (as in normal diesel fuel), (2) changes to $$HC_{ppm(C14)} = \frac{\dot{m}_{fuel}/198}{\dot{m}_{exh}/29} = \frac{29 \cdot C_p \cdot \Delta T}{198 \cdot \eta \cdot \Delta H} \cdot 10^6 \quad (3)$$

Since the HC concentration (ppm) is normally corrected to $C_1$, the ppm in $C_1$ will be $$\begin{aligned} HC_{ppm} &= HC_{ppm(C1)} \\ &= 14 \cdot \frac{29 \cdot C_p \cdot \Delta T}{198 \cdot \eta \cdot \Delta H} \cdot 10^6 \\ &= \text{constant} \cdot \frac{\Delta T}{\eta} \\ &= k \cdot \frac{\Delta T}{\eta} \end{aligned} \quad (4)$$

If one applies Equ. (4) to DOC, DPF and SCR+clean up DOC respectively, we have:

$$HC_{ppm,doc} = k \cdot \frac{\Delta T_{doc}}{\eta_{doc}} \quad (5)$$

$$HC_{ppm,dpf} = k \cdot \frac{\Delta T_{dpf}}{\eta_{dpf}} \quad (6)$$

$$HC_{ppm,scr+cleanupdoc} = k \cdot \frac{\Delta T_{scr+cleanupdoc}}{\eta_{scr+cleanupdoc}} \quad (7)$$

The HC slip after each catalyst will be:

$$HC_{slip,doc} = (1 - \eta_{doc}) \cdot HC_{ppm,doc} = (1 - \eta_{doc}) \cdot k \cdot \frac{\Delta T_{doc}}{\eta_{doc}} \quad (8)$$

$$HC_{slip,dpf} = (1 - \eta_{dpf}) \cdot HC_{ppm,dpf} = (1 - \eta_{dpf}) \cdot k \cdot \frac{\Delta T_{dpf}}{\eta_{dpf}} \quad (9)$$

$$\begin{aligned} HC_{slip,scr+cleanupdoc} &= (1 - \eta_{scr+cleanupdoc}) \cdot HC_{ppm,scr+cleanupdoc} \\ &= (1 - \eta_{scr+cleanupdoc}) \cdot k \cdot \frac{\Delta T_{scr+cleanupdoc}}{\eta_{scr+cleanupdoc}} \end{aligned} \quad (10)$$

Since the HC slip from upstream catalyst is the HC input for the catalyst downstream, so Equ. (6) equals to Equ. (8), and Equ. (7) equals to Equ. (9). Therefore we get:

$$\eta_{dpf} = \frac{\eta_{doc} \cdot \Delta T_{dpf}}{(1 - \eta_{doc}) \cdot \Delta T_{doc}} \quad (11)$$

and $$\eta_{scr+cleanupdoc} = \frac{\eta_{dpf} \cdot \Delta T_{scr+cleanupdoc}}{(1 - \eta_{dpf}) \cdot \Delta T_{dpf}} \quad (12)$$

Substituting Equ. (11) to Equ. (12), then Equ. (12 to Equ. (10):

$$\begin{aligned} HC_{slip,scr+cleanupdoc} &= HC_{slip,tailpipe} \\ &= k \cdot \left( \frac{(1 - \eta_{doc})}{\eta_{doc}} \cdot \Delta T_{doc} - \Delta T_{dpf} - \Delta T_{scr+cleanupdoc} \right) \end{aligned} \quad (13)$$

When an aftertreatment device has no clean up DOC, the ΔT scr+clean up doc=0. If there is no coating on the DPF, ΔT dpf=0. Regardless of either contingency, equation 13 is operative in both situations.

The words used in the discussion of the disclosure are words of description, not words of limitation. Those skilled in the art recognize that many variations and modifications are possible without departing from the scope and spirit of the invention as set forth in the appended claims.

What is claimed as new and desired to be protected by Letters Patent of the United States is:

1. A method to determine hydrocarbon slip in a compression ignition engine equipped with an electronic control unit having memory; said engine coupled to an exhaust gas aftertreatment system having a diesel oxidation catalyst (DOC), a diesel particulate filter (DPF), a selective catalyst reducer (SCR) and a clean up diesel oxidation catalyst comprising:
   determining a change in temperature of exhaust gas flow through the diesel oxidation catalyst component;
   determining a change in temperature of exhaust gas flow through the diesel particulate filter;
   determining a change in temperature through the selective catalyst reducer at the clean-up diesel oxidation catalyst outlet; and
   determining efficiency of each exhaust gas aftertreatment component by determining whether the component has a coating of excess hydrocarbon.

2. The method of claim 1, wherein the change in exhaust gas flow temperature through the diesel catalyst component is determined according to:

$\Delta T_{doc}$=Sensed DOC out Temperature−Virtual DOC Out Temperature.

3. The method of claim 1, wherein the change in temperature of the DPF is determined according to:

$\Delta T_{DPF}$=Sensed DPF Out Temperature−Virtual DPF Out Temperature.

4. The method of claim 1, wherein the change in temperature of the exhaust gas flow at the clean-up DOC outlet is determined according to:

$\Delta T_{SCR-Clean\text{-}upDOC}$=Sensed Clean-Up DOC Out Temperature−Virtual Clean-Up Out DOC Temperature.

5. The method of claim 1, wherein the energy released at each catalyst due to hydrocarbon burning is determined according to:

$$\dot{Q} = C_p \cdot \dot{m}_{exh} \cdot \Delta T = f \cdot \dot{m}_{fuel} \cdot \Delta H \quad (1)$$

Wherein
$\eta$—catalyst efficiency
$\dot{m}_{fuel}$—Hydrocarbon (HC) Flow rate into the catalyst, kg/s ΔH—heat content of fuel, 43 MJ/kg for diesel fuel
ΔT—Temperature increase due to HC burning (explained above)
$C_p$—exhaust specific heat, kJ/kg·K
$\dot{m}_{exh}$—Exhaust gas flow rate through the catalyst, kg/s.

6. The method of claim 5, wherein the HC flow in mass faction is determined according to:

$$HC_{massfraction} = \frac{\dot{m}_{fuel}}{\dot{m}_{exh}} = \frac{C_p \cdot \Delta T}{\eta \cdot \Delta H}. \quad (2)$$

7. The method of claim 6, wherein the mass fraction may be is converted to a volume fraction according to:

$$HC_{ppm(C14)} = \frac{\dot{m}_{fuel}/198}{\dot{m}_{exh}/29} = \frac{29 \cdot C_p \cdot \Delta T}{198 \cdot \eta \cdot \Delta H} \cdot 10^6. \quad (3)$$

8. The method of claim 7, wherein the HC concentration is determined in ppm and corrected to $C_1$ according to:

$$\begin{aligned} HC_{ppm} &= HC_{ppm(C1)} \\ &= 14 \cdot \frac{29 \cdot C_p \cdot \Delta T}{198 \cdot \eta \cdot \Delta H} \cdot 10^6 \\ &= \text{constant} \cdot \frac{\Delta T}{\eta} \\ &= k \cdot \frac{\Delta T}{\eta}. \end{aligned} \quad (4)$$

9. The method of claim 8, wherein the HC concentration expressed in ppm at the DOC, DPF and SCR+clean up DOC respectively, is determined according to:

$$HC_{ppm,doc} = k \cdot \frac{\Delta T_{doc}}{\eta_{doc}} \quad (5)$$

$$HC_{ppm,dpf} = k \cdot \frac{\Delta T_{dpf}}{\eta_{dpf}} \quad (6)$$

$$HC_{ppm,scr+cleanupdoc} = k \cdot \frac{\Delta T_{scr+cleanupdoc}}{\eta_{scr+cleanupdoc}}. \quad (7)$$

10. The method of claim 9, wherein the HC slip after each catalyst is determined according to:

$$HC_{slip,doc} = (1-\eta_{doc}) \cdot HC_{ppm,doc} = (1-\eta_{doc}) \cdot k \cdot \frac{\Delta T_{doc}}{\eta_{doc}} \quad (8)$$

$$HC_{slip,dpf} = (1-\eta_{dpf}) \cdot HC_{ppm,dpf} = (1-\eta_{dpf}) \cdot k \cdot \frac{\Delta T_{dpf}}{\eta_{dpf}} \quad (9)$$

$$\begin{aligned} HC_{slip,scr+cleanupdoc} &= (1-\eta_{scr+cleanupdoc}) \cdot HC_{ppm,scr+cleanupdoc} \\ &= (1-\eta_{scr+cleanupdoc}) \cdot k \cdot \frac{\Delta T_{scr+cleanupdoc}}{\eta_{scr+cleanupdoc}}. \end{aligned} \quad (10)$$

11. The method of claim 10, wherein the HC slip from an upstream catalyst is the HC input for the catalyst downstream, Equ. (6) equals to Equ. (8), and Equ. (7) equals Equ. (9), expressed according to:

$$\eta_{dpf} = \frac{\eta_{doc} \cdot \Delta T_{dpf}}{(1-\eta_{doc}) \cdot \Delta T_{doc}} \quad (11)$$

and $$\eta_{scr+cleanupdoc} = \frac{\eta_{dpf} \cdot \Delta T_{scr+cleanupdoc}}{(1-\eta_{dpf}) \cdot \Delta T_{dpf}}. \quad (12)$$

12. The method of claim 11, wherein substituting Equ. (11) into Equ. (12) then substituting Equ. (12) into Equ. (10), expressed according to:

$$\begin{aligned} HC_{slip,scr+cleanupdoc} &= HC_{slip,tailpipec} \\ &= k \cdot \left( \frac{(1-\eta_{doc})}{\eta_{doc}} \cdot \Delta T_{doc} - \Delta T_{dpf} - \Delta T_{scr+cleanupdoc} \right). \end{aligned} \quad (13)$$

\* \* \* \* \*